United States Patent
Khurana et al.

(10) Patent No.: US 11,568,168 B2
(45) Date of Patent: Jan. 31, 2023

(54) GENERATING SYNTHETIC PHOTO-REALISTIC IMAGES

(71) Applicant: Shutterstock, Inc., New York, NY (US)

(72) Inventors: Rashi Khurana, Jersey City, NJ (US); Katy McLoughlin, Ossining, NY (US); Bryan Michael Minor, Dollard-des Ormeaux (CA)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 16/377,780

(22) Filed: Apr. 8, 2019

(65) Prior Publication Data
US 2020/0320341 A1 Oct. 8, 2020

(51) Int. Cl.
*G06K 9/62* (2022.01)
*G06F 3/04845* (2022.01)
*G06T 11/00* (2006.01)
*G06F 3/0482* (2013.01)
*G06T 11/60* (2006.01)
*G06V 40/16* (2022.01)

(52) U.S. Cl.
CPC ......... *G06K 9/6256* (2013.01); *G06F 3/0482* (2013.01); *G06F 3/04845* (2013.01); *G06K 9/6253* (2013.01); *G06T 11/001* (2013.01); *G06T 11/60* (2013.01); *G06V 40/168* (2022.01); *G06V 40/174* (2022.01); *G06T 2200/24* (2013.01)

(58) Field of Classification Search
None
See application file for complete search history.

(56) References Cited

U.S. PATENT DOCUMENTS

| | | | |
|---|---|---|---|
| 9,799,096 B1 | 10/2017 | De la Torre et al. | |
| 2007/0165022 A1* | 7/2007 | Peleg | G11B 27/036 345/419 |
| 2011/0072048 A1* | 3/2011 | Hua | G06F 16/58 707/780 |
| 2011/0123118 A1* | 5/2011 | Nayar | G06T 11/60 382/190 |
| 2014/0184858 A1* | 7/2014 | Yu | H04N 5/23229 348/241 |

(Continued)

OTHER PUBLICATIONS

Fake Faces, CNN: https://www.cnn.com/2019/02/28/tech/ai-fake-faces/index.html.

(Continued)

*Primary Examiner* — Aaron M Richer
(74) *Attorney, Agent, or Firm* — McDermott Will & Emery LLP

(57) ABSTRACT

The disclosure relates to tools and methods for creating synthetic images with photo-realistic images. The disclosed face generation technology focuses on photo-realistic results by leveraging analysis of a pool of pre-selected images based on a user selection and preferences. The tools and methods as described herein include limiting the pool of pre-selected images by one or more criteria, including, for example, but not limited to gender, age, skin color, expression, etc. The pre-selection of a more curated pool of images allows a user to include a desired set of criteria and specifications that the user would want in a generated synthetic image or images.

20 Claims, 5 Drawing Sheets

(56) References Cited

U.S. PATENT DOCUMENTS

| | | | |
|---|---|---|---|
| 2017/0330320 A1* | 11/2017 | Lynch | G16B 99/00 |
| 2018/0012386 A1 | 1/2018 | Kemelmaher | |
| 2018/0143430 A1 | 5/2018 | Koppal et al. | |
| 2018/0189581 A1* | 7/2018 | Turcot | G06K 9/4628 |
| 2019/0087683 A1 | 3/2019 | Liu | |
| 2019/0246048 A1* | 8/2019 | Matsui | H04N 5/272 |
| 2019/0289225 A1* | 9/2019 | Vonikakis | H04N 5/23219 |
| 2019/0294871 A1* | 9/2019 | Vaezi Joze | G06V 40/23 |
| 2019/0295302 A1* | 9/2019 | Fu | G06N 3/0454 |

OTHER PUBLICATIONS

Fake Faces, Engadget: https://www.engadget.com/2019/02/15/ai-creates-infinite-fake-faces.

Taihong Xiao et al., "ELEGANT: Exchanging Latent Encodings with GAN for Transferring Multiple Face Attributes", arXiv:1803.10562v2, Jul. 25, 2018, pp. 1-18 [retrieved on Jul. 3, 2020]. Retrieved from <https://arxiv.org/pdf/1803.10562.pdf>.

International Search Report and Written Opinion dated Jul. 24, 2020 in International Application No. PCT/US2020/026407.

* cited by examiner

GENERATING SYNTHETIC PHOTO-REALISTIC IMAGES

TECHNICAL FIELD

The present disclosure generally relates to image editing software for generating synthetic images, and more specifically relates to creating photo-realistic composite images using a model trained on a pool of photos.

BACKGROUND

Currently, creation of anonymous faces or avatars is limited to a non-photo-realistic style. In the video game sphere or on the World Wide Web, for example, an animated look is acceptable as the current trend of cartoonish avatars tends towards custom designed or randomly generated faces. However, current synthetic face generation technologies do not produce photo-realistic results that consumers desire.

The description provided in the background section should not be assumed to be prior art merely because it is mentioned in or associated with the background section. The background section may include information that describes one or more aspects of the subject technology.

SUMMARY

At least one aspect of the disclosure is directed to a computer-implemented method for providing a synthetic image. The method includes providing for display a target image for modification in an image editing application. The method also includes receiving, in a user interface of the image editing application, a selection of at least one criteria of the target image. The method further includes providing, based on the selection of the at least one criteria, a pool of images retrieved from a network. The method further includes selecting, in the user interface of the image editing application, one or more images from the pool of images. The method also includes applying a General Adversarial Network (GAN) algorithm to the one or more selected images. The method further includes providing for display one or more synthetic images generated by the GAN algorithm in the user interface of the image editing application based on the at least one criteria of the target image. The method further includes selecting, in the user interface of the image editing application, the synthetic image from the one or more synthetic images.

In some implementations, selecting the at least one criteria of the target image includes selecting a gender from a list of a male or a female, an age category from a list of infant, child, teen, 20s-30s, 40s-50s, 60s-70s, or older, an expression from a list of love, happiness, relief, joy, surprise, anger, sadness, shame, fear, smile, or laughter, or an ethnicity or race from a list of African, African American, Black, Brazilian, Caucasian, East Asian, Hispanic, Japanese, Middle Eastern, East European, West European, South European, North European, Scandinavian, Native American, or Pacific Islanders. In some implementations, selecting the at least one criteria of the target image includes selecting one or more portions of the target image by specified pixel coordinates and/or dimensions of the target image. In some implementations, selecting the at least one criteria of the target image includes selecting one or more portions of the target image via a selector tool that is available in a drawing application, a presentation application, or a drawing tool, such as paint. In some implementations, the GAN algorithm includes a generative network and a discriminative network and the at least one criteria of the target image is an input parameter for the generative network.

In some implementations, the generative network generate an image that is compared against the discriminative network to determine whether the image is real or fake. In some implementations, wherein the GAN algorithm includes a generative network and a discriminative network that train each other in a recursive process to generate the one or more synthetic images. In some implementations, the image editing application is executed on a server and displayed in an internet browser.

In some implementations, the at least one criteria of the target image is selected from the list of a portion of the target image showing an eye, a portion of the target image showing an eyebrow, a portion of the target image showing a nose, a portion of the target image showing a set of lips, a portion of the target image showing an ear, a portion of the target image showing a forehead, and a portion of the target image showing hair. In some implementations, multiple portions of the target image are selected for application of the GAN algorithm.

In some implementations, the method further includes selecting, in the user interface of the image editing application, one or more preferential criteria to further change facial attributes of the synthetic image. In some implementations, the method further includes applying the GAN algorithm to generate a new set of synthetic images.

In some implementations, the selecting of one or more preferential criteria includes selecting a gender type from a list of a male or a female or selecting an age category from a list of infant, child, teen, 20s-30s, 40s-50s, 60s-70s, or older. In some implementations, the selecting of one or more preferential criteria includes selecting one category from a list of African, African American, Black, Brazilian, Caucasian, East Asian, Hispanic, Japanese, Middle Eastern, East European, West European, South European, North European, Scandinavian, Native American, or Pacific Islanders. In some implementations, the selecting one or more preferential criteria includes selecting an expression from a list of love, happiness, relief, joy, surprise, anger, sadness, shame, fear, smile, or laughter.

At least one aspect of the disclosure is directed to a system for providing a synthetic image. The system includes a memory and a processor configured to execute instructions. In some implementations, upon execution, the processor is instructed to provide for display a target image for modification in an image editing application. The processor is also instructed to receive, in a user interface of the image editing application, a selection of at least one criteria of the target image. The processor is also instructed to provide, based on the selection of the at least one criteria, a pool of images retrieved from a network. The processor is also instructed to select, in the user interface of the image editing application, one or more images from the pool of images. The processor is also instructed to apply a GAN algorithm to the one or more selected images. The processor is also instructed to provide for display one or more synthetic images generated by the GAN algorithm in the user interface of the image editing application based on the at least one feature of the target image. The processor is also instructed to select, in the user interface of the image editing application, the synthetic image from the one or more synthetic images.

In some implementations, the processor is further instructed to select, in the user interface of the image editing application, one or more preferential criteria to further change facial attributes of the synthetic image. In some implementations, the processor configured to execute instructions which, when executed, cause the processor to apply the GAN algorithm to generate a new set of synthetic images based on the one or more preferential criteria to further change facial attributes of the synthetic image. In some implementations, the at least one criteria is a gender from a list of a male or a female, an age category from a list of infant, child, teen, 20s-30s, 40s-50s, 60s-70s, or older, an expression from a list of love, happiness, relief, joy, surprise, anger, sadness, shame, fear, smile, or laughter, or an ethnicity or race from a list of African, African American, Black, Brazilian, Caucasian, East Asian, Hispanic, Japanese, Middle Eastern, East European, West European, South European, North European, Scandinavian, Native American, or Pacific Islanders. In some implementations, the at least one criteria of the target image is selected from the list of a portion of the target image showing an eye, a portion of the target image showing an eyebrow, a portion of the target image showing a nose, a portion of the target image showing a set of lips, a portion of the target image showing an ear, a portion of the target image showing a forehead, and a portion of the target image showing hair. In some implementations, the GAN algorithm includes a generative network and a discriminative network that train each other in a recursive process to generate the one or more synthetic images.

At least one aspect of the disclosure is directed to a non-transitory machine-readable storage medium having machine-readable instructions for causing a processor to execute a method for providing a synthetic image. In some implementations, the method includes providing for display a target image for modification in an image editing application. The method also includes receiving, in a user interface of the image editing application, a selection of at least one criteria of the target image. The method further includes providing, based on the selection of the at least one criteria, a pool of images from a network. The method further includes selecting, in the user interface of the image editing application, one or more images from the pool of images. The method also includes applying a GAN algorithm to the one or more selected images. The method further includes providing for display one or more synthetic images generated by the GAN algorithm in the user interface of the image editing application based on modification of the at least one feature of the target image. The method further includes selecting, in the user interface of the image editing application, the synthetic image from the one or more synthetic images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1A:
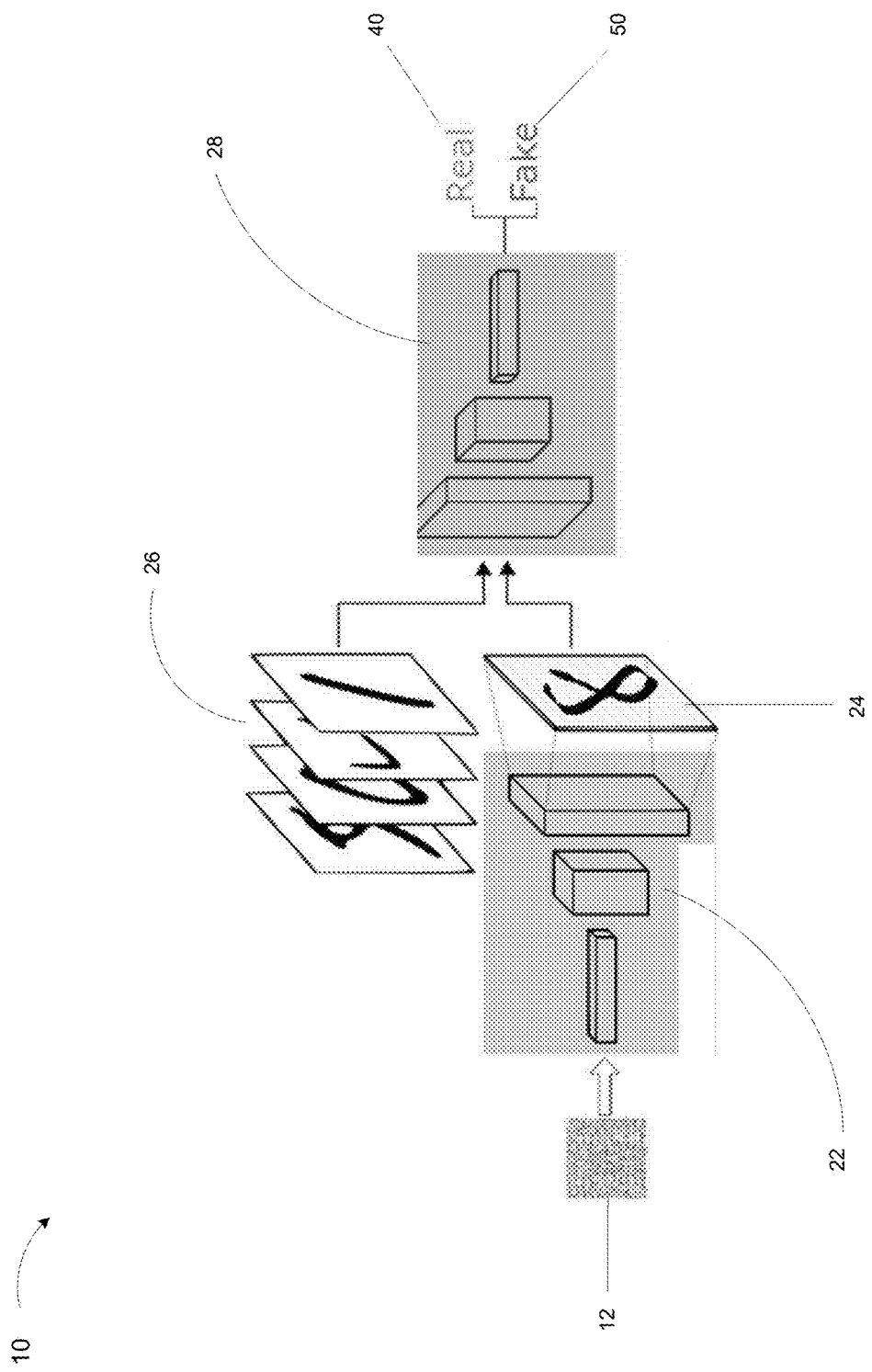
FIG. 1A is a schematic illustration of a General Adversarial Network (GAN) according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

It would be preferable to move towards photo-realistic creative solutions that allow customers to generate and enjoy more personalized representations of themselves, including in photo-realistic images. The disclosure as described herein offers an innovative solution to creating photo-realistic images. The disclosure generally relates to tools and methods for creating synthetic images with realistic, yet anonymous faces. As described herein, the disclosed face generation technology focuses on photo-realistic results by leveraging analysis of a pool of pre-selected images based on a user selection and preferences. The tools and methods as described herein include limiting the pool of pre-selected images by one or more factors, including, for example, but not limited to gender, age, skin color, expression, etc. As described herein, the pre-selection of a more curated pool of images allows a user to include a desired set of criteria and specifications that the user would want in a generated synthetic image.

As described herein, the disclosed technology centers on creating synthetic faces using a computer model trained on a pool of pre-selected images. Using artificial intelligence and machine learning, the synthetic images are then generated to look photo-realistic, and therefore will not include any particular facial features that belong to a particular person. Since the synthetic images do not include features taken from a particular person, the potential issues around legality of use and personal privacy can be reduced or eliminated, even if original photos of professional models or private photos of individual persons, are used to inform the creation of the synthetic photo-realistic images. As such, a need for consent or explicit permission to use those particular photos can be avoided, for example, in commercial advertising of a sensitive product or issue. Moreover, as described herein, the synthetic images are generated without combining individual facial features or elements, such as the nose, eyes, chin, etc., of different individual faces of particular people. Since the synthetic images are composites of many other faces, the anonymous, photo-realistic images can be used for many purposes with no legal entanglements.

According to the tools and methods disclosed herein, a user selects one or several target images that the user will use as a basis for the synthetic image. In some implementations, the target image contains one or more human faces. In some implementations, the user identifies one or more faces in the target image. In some implementations, the user elects to anonymize the faces in the target image. In some implementations, the anonymization process can include other aspects of the target image, including commonly occurring elements in a photograph, such as, for example, a city skyline, a modern interior or an intimate party scene, etc.

In some implementations, the user selects one or more criteria from the list including, but not limited to, a gender type from a list of a male or a female or selecting an age category from a list of infant, child, teen, 20s-30s, 40s-50s, 60s-70s, or older. In some implementations, the selecting of one or more preferential criteria includes selecting one category from a list of African, African American, Black, Brazilian, Caucasian, East Asian, Hispanic, Japanese, Middle Eastern, East European, West European, South European, North European, Scandinavian, Native American, or Pacific Islanders. In some implementations, the selecting one or more preferential criteria includes selecting an expression from a list of love, happiness, relief, joy, surprise, anger, sadness, shame, fear, smile, or laughter. In some implementations, the user selects one or more criteria from the target image for synthesizing.

In some implementations, the user selects one or more portions of the one or more faces in the target image for synthesizing. In some implementations, the selected criteria of the target image is from the list of a portion of the target image showing an eye, a portion of the target image showing an eyebrow, a portion of the target image showing a nose, a portion of the target image showing a set of lips, a portion of the target image showing an ear, a portion of the target image showing a forehead, and a portion of the target image showing hair. In some implementations, multiple portions of the target image are selected for application of the GAN algorithm.

In some implementations, based on at least one of the coordinates, shape and size of the target image, the user defines criteria for selecting one or more images from the pool of images that match the criteria.

In some implementations, the selection includes one of gender, ethnicity, age and other more complex criteria that can further filter the pool of pre-selected images.

In some implementations, the target image is divided into one or more portions. In some implementations, one or more portions of the images are combined to synthesize a new image by putting them one on top of the other to get the final anonymized output as the new image that can replace the target image.

In some implementations, the selection made during customization of the target image based on age, gender, expression, etc. limits the pool of candidate images used to create the synthetic image. In some implementations, the user includes the target image in a computer program that leverages its analysis of other images to generate replacement faces for the target image. In some implementations, the pool of pre-selected images that match the selected criteria are included as a source image for the synthetic image.

As described herein, a synthetic image may appear realistic enough to be confused for a real image. In some implementations, the generation of the synthetic image is performed by application of artificial intelligence, including machine learning. Machine learning includes software algorithms that rely on learning from examples. Based on a large set of relevant data fed into an algorithm, certain machine-learning algorithms can be trained to perform a specific task. For example, an algorithm can be configured so that real images can be analyzed and used as source material for generating synthetic images. Such algorithms based on artificial intelligence and machine learning include for example, General Adversarial Networks.

FIG. 1A is a schematic illustration of a General Adversarial Network 10 according to certain aspects of the disclosure. GAN 10 typically includes two types of neural networks: a generative network 22 (also referred to herein as generative neural network 22) and a discriminative network 28 (also referred to herein as discriminative neural network 28). The generative network 22 creates synthetic and real images 24 and trains the discriminative network 28 to view the image as a human being would, and distinguish between the real images and the synthetic images. In essence, GAN 10 includes two different neural networks that challenge each other to learn to create and improve new content in a recursive process. As shown in FIG. 1A, random noise 12 is input into the generative network 22, which then produces a fake image 24. The fake image 24 and a training set 26 of images are then input into the discriminative network 28 to distinguish real images from fake images. In some implementations, the generator 22 tries to trace back from output to the input and the discriminator 28 further distinguishes real versus fake images, and scores the result. If the discriminator 28 identifies a fake images as a real image, the discriminator 28 re-feeds the generator 22 another image, and in a cyclical manner, the generator 22 and the discriminator 28 recursively train each other.

In some implementations as described herein, an unsupervised learning of the generative model is used herein to study the underlying structure of the input data for human facial images. In "unsupervised learning," which is another branch of machine learning, there's no reference data for the initial input. In other words, the algorithm ingests unlabeled data and draws inferences and finds patterns. Unsupervised learning is especially useful for cases where there are hidden patterns that humans cannot define. In some implementations, an unsupervised learning algorithm is used to learn the distribution of the input data, for example, pixel height of noses, width and height, shape, and colors, which can be defined as input data $x'=p(x)$ or $p(x,y,z)$. If there are multiple parameters, a synthetic output target nose $y'$ can be generated by using multiples of those functions. As part of this GAN process, unlabeled data is used to generate examples of "fake" images, this allows the learning of realistic images without the need for human labeled data for training and testing. This synthetic "fake" data is required to allow the proper training and validation of the GAN process to generate realistic facial images.

In some implementations, multiple parts of the face, such as nose, ears, eyes, cheeks, can be identified for synthesizing. For each one of the parts, for example, an eye, there will be a set of variables $n'=p(n)$ or $p(n, q, r)$, for example, width and height, shape, colors of the eye. In some implementations, multiple input images are identified as source images for using the eye from those input images. In some implementations, a generative synthetic model is used to generate a fake face with an eye that is a blend of many of the eyes from those input images. The discriminative model will keep feeding this data of the eye back into the generative model to train it to understand fake vs real. To further explain how GANs can be used to generate a synthetic image, an example method is provided below to illustrate the process of creating a synthetic image on a computer.

Figure 1B:
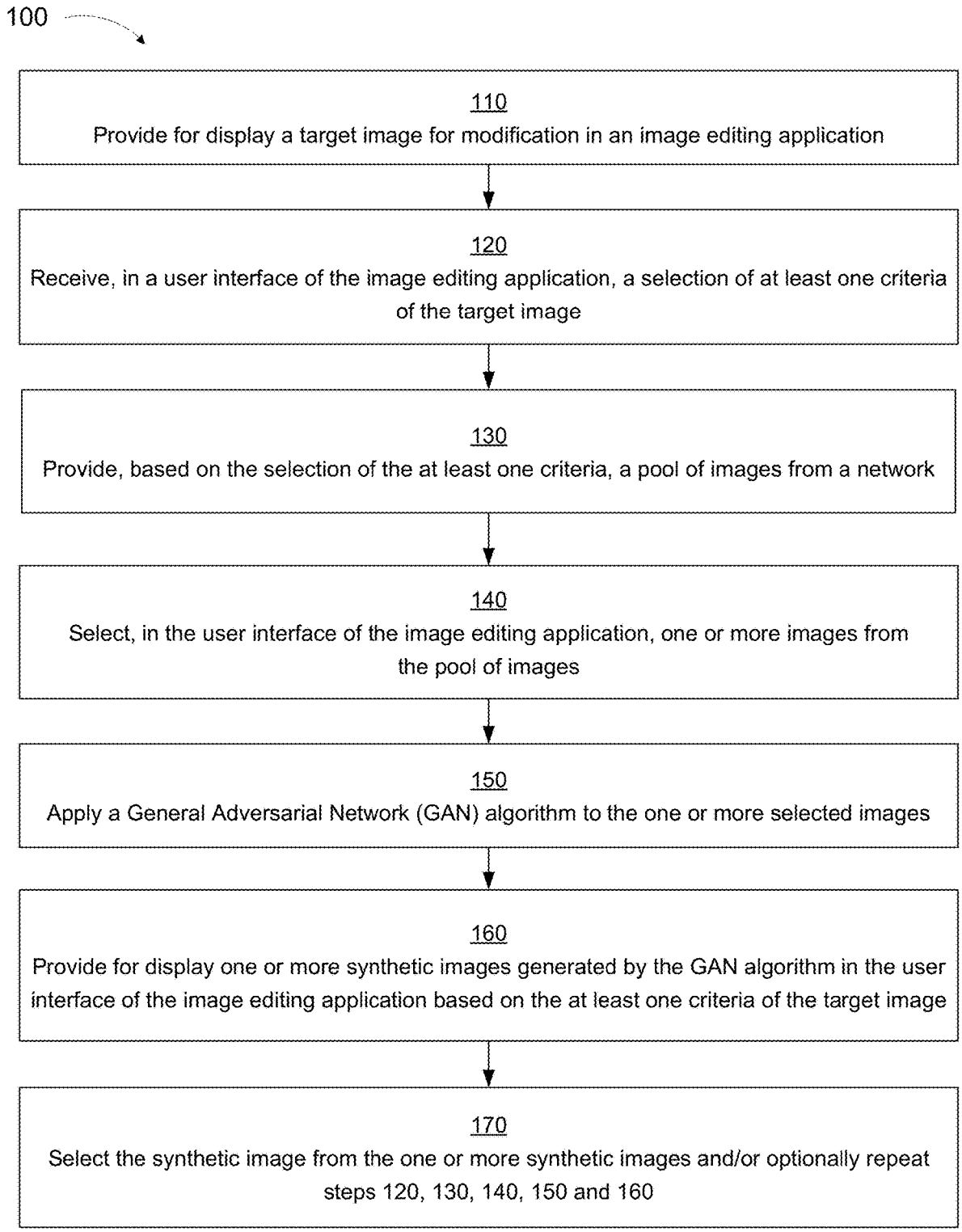
FIG. 1B is a flowchart of a computer-implemented method for providing a synthetic image, according to an illustrative implementation.

FIG. 1B is a flowchart of a computer-implemented method 100 for providing a synthetic image, according to an illustrative implementation. It should be noted that the process steps of FIG. 1 may be performed by any computing system, including a portable computing device, a personal computing device, and a server via a graphical user interface on an internet web browser or a standalone application.

As shown in FIG. 1B, the method 100 for providing a synthetic image begins with step 110 for providing for display a target image for modification in an image editing application. In some implementations, step 110 includes providing a plurality of images from which a target image is selected. In some implementations, the target image can be located locally on a hard drive of the computing device. In some implementations, the target image can be located on a server and searchable via an internet browser on the world wide web. In some implementations, the target image can be loaded from an external portable drive, such as a USB flash drive or disk.

The method 100 further includes step 120 receiving, in a user interface of the image editing application, a selection of at least one criteria of the target image. In some implementations, the at least one criteria (or feature) of the target image is selected via a graphical user interface that presents each criterion (for example age) with its allowable values (for example infant, child, teen, 20s-30s, 40s-50s, 60s-70s, or older) and allows the user to make a selection.

In some implementations, at least one criteria of the target image includes one of gender, age, ethnicity, or facial expression. In some implementations, at least one criteria of the target image includes one of a city skyline, a logo, a face, a modern interior or an intimate party scene. In some implementations, at least one criteria of the target image includes one of individual facial criteria or elements, such as the nose, eyes, chin, etc. In some implementations, at least one feature of the target image includes one of a gender criteria includes selecting a gender type from a list of a male, a female or unidentified.

In some implementations, one of the user input criteria for the age criteria includes selecting a category from a list of infant, child, teen, 20s-30s, 40s-50s, 60s-70s, or older. In some implementations, one of the user input criteria for the age feature includes a slider bar to select a range of ages. In some implementations, one of the user input criteria for the ethnicity feature includes selecting one or more categories from a list of African, African American, Black, Brazilian, Caucasian, East Asian, Hispanic, Japanese, Middle Eastern, East European, West European, South European, North European, Scandinavian, Native American, or Pacific Islanders. In some implementations, one of the user input criteria for the facial expression feature includes selecting one or more expressions from a list of love, happiness, relief, joy, surprise, anger, sadness, shame, fear, smile, or laughter.

In some implementations, the target image can be divided into one or more portions which the user selects. In some implementations, the at least one portion of the target image is one of a portion showing an eye, a portion showing an eyebrow, a portion showing a nose, a portion showing a set of lips, a portion showing an ear, a portion showing a forehead, or a portion showing hair.

The method 100 further includes step 130 for providing, based on the selection of the at least one criteria, a pool of images from a network (internally or externally or at a server). In some implementations, the pool of images are pre-selected from a library of images based on the user input criteria of the at least one feature of the target image.

The method 100 further includes step 140 for selecting, in the user interface of the image editing application, one or more images from the pool of images to be used as source images in generating the synthetic image. In some implementations, one or more portions of the pool of images are used for blending to form the one or more portions of the synthetic image. For example, the one or more portions of the pool of images that include a nose can be blended to form a portion that includes a synthetic nose in the synthetic image.

As shown in FIG. 1B, the method 100 further includes step 150 for applying a General Adversarial Network (GAN) algorithm to the one or more images from the pool of images. In step 150, one or more portions or criteria (features) of the pre-selected images are blended to form the respective one or more portions or criteria of a synthetic image. In some implementations, the recursive process of GAN algorithm is run until the generated synthetic image no longer resembles any of the source images used. In some implementations, the recursive process of GAN algorithm is run to produce an original synthetic image with optimal use of user provided features.

Once the synthetic image is created, the method 100 further includes step 160 for providing for display one or more synthetic images generated by the GAN algorithm in the user interface of the image editing application based on the at least one feature of the target image. At step 170, the user can select the synthetic image from the one or more synthetic images generated by the GAN algorithm. And optionally, if the one or more synthetic images generated by the GAN algorithm are not to user's satisfaction, the step 170 includes an option for selecting one or more preferential criteria to further change facial attributes of the synthetic image. For example, the step 170 optionally includes repeating step 120 for selecting a new set of criteria, followed by step 130 for providing a new pool of images, followed by step 140 for selecting one or more images from the new pool of images to be used as source images, followed by step 150 application of the GAN algorithm, and followed by step 160 for providing a new set of synthetic images for the user to select from. In other words, steps 120, 130, 140, 150, and 160 can be repeated until the desired synthetic image is obtained.

Figure 2A:
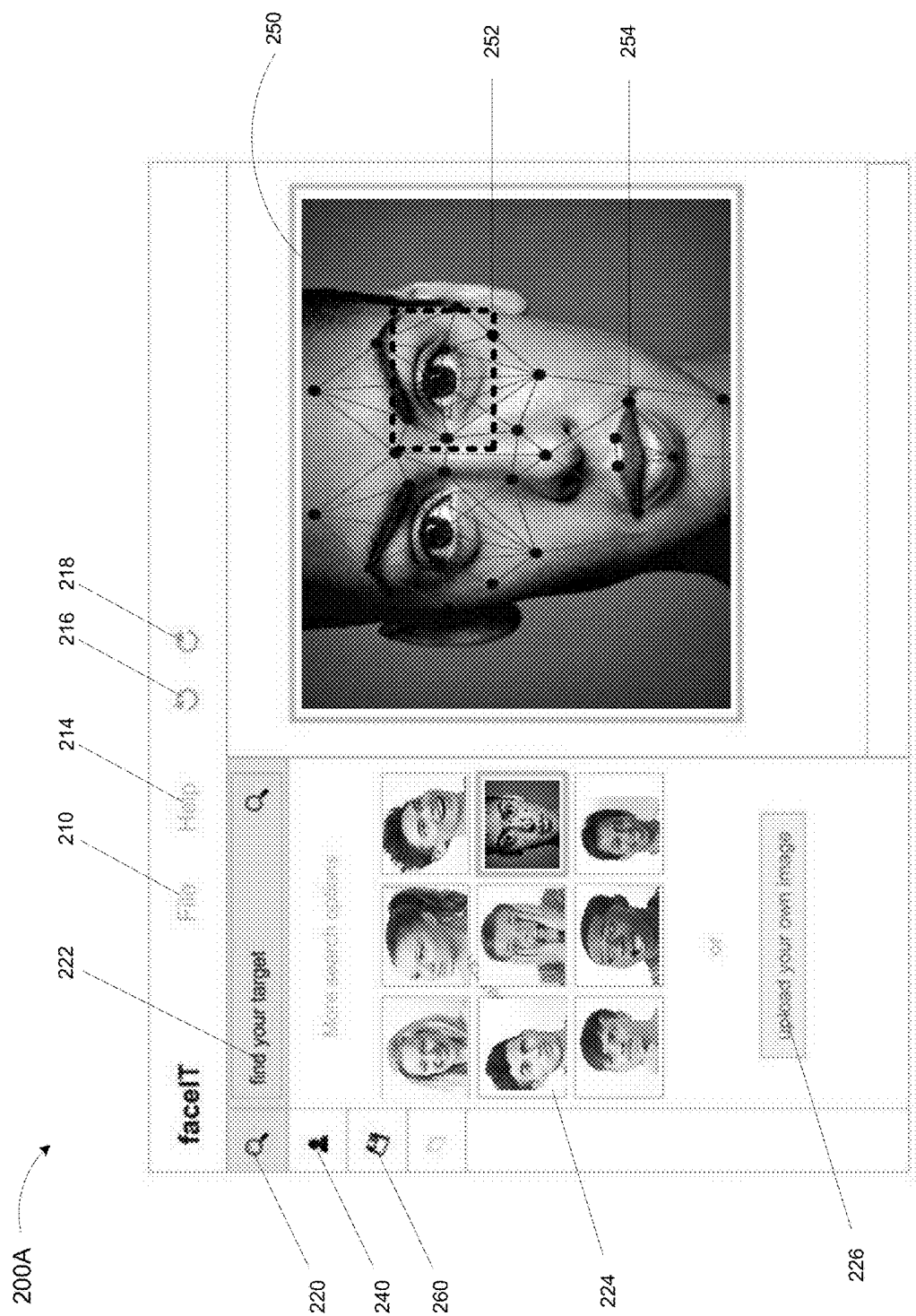
FIG. 2A is an example user interface for an image editing application for providing a synthetic image, according to an illustrative implementation.

FIG. 2A is an example user interface 200A for an image editing application for providing a synthetic image, according to an illustrative implementation. As shown in FIG. 2A, the user interface 200A includes a set of menu items, including File 210, Help 214, back function 216 (or "undo" function 216) and forward function 218 (or "redo" function 218) on the top of the user interface 200A. The user interface 200A also includes a search icon 220 and a search bar 222 for searching a target image and further includes profile icon 240 and save icon 260. Once the search is complete, a plurality of images 224 are displayed as thumbnails in a grid and one of the images 224 can be selected as the target image. Alternatively, an image can be uploaded via upload your own image 226 to be used as the target image. Once the target image is selected from the list of the thumbnails, a large image of the thumbnail is shown as the target image 250 on the right side of the user interface 200A. In some implementations, the target image 250 can be divided into multiple portions and a rectangular dash box 252 can be used to identify the portion that includes a feature of interest. In some implementations, a lasso tool can be used to circle or highlight a portion or a feature of the target image 250. Any available tool or technique can be used herein to select a feature of interest for processing.

Figure 2B:
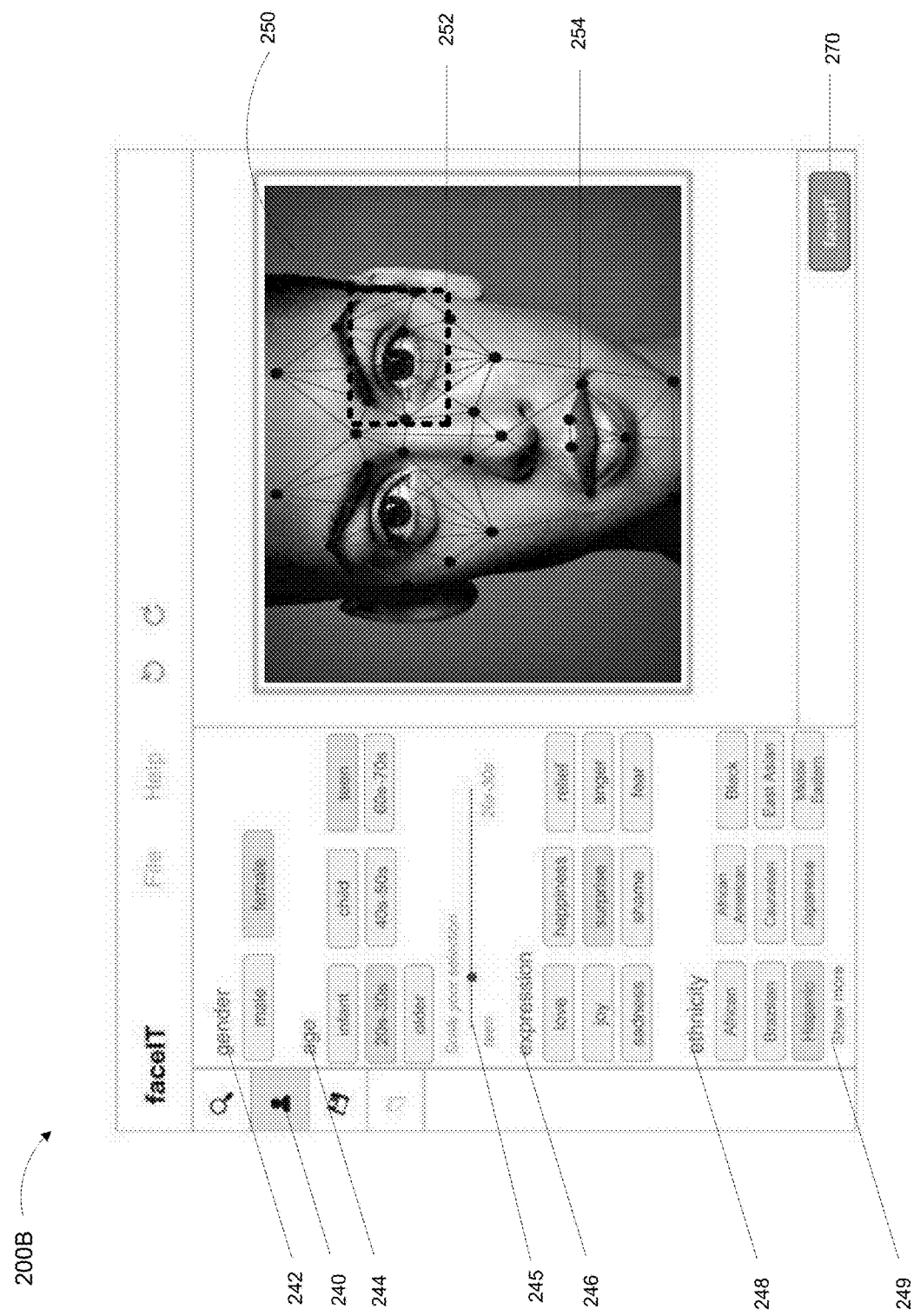
FIG. 2B is another example user interface for an image editing application for providing a synthetic image, according to an illustrative implementation.

FIG. 2B is another example user interface 200B for an image editing application for providing a synthetic image, according to an illustrative implementation. Once the target image is selected, a number of preferential filters in the profile 240 can be further selected as shown in the user interface 200B to further change the facial attributes. The user interface 200B includes a preferential filter option to select a gender 242 from a list of a male or a female, a preferential filter option to select age from a list of infant, child, teen, 20s-30s, 40s-50s, 60s-70s, or older. In some implementations, the user interface 200B includes a sliding bar 245 as a preferential filter to select a range of ages. In some implementations, the user interface 200B includes a preferential facial expression feature 246 with one or more expressions from a list of love, happiness, relief, joy, surprise, anger, sadness, shame, fear, smile, or laughter. In some implementations, the user interface 200B includes a preferential ethnicity feature 248 that includes one or more categories from a list of African, African American, Black, Brazilian, Caucasian, East Asian, Hispanic, Japanese, Middle Eastern, and show more icon 249, which further provides additional categories, such as East European, West European, South European, North European, Scandinavian, Native American, or Pacific Islanders. Once the desired categories and/or preferential criteria are selected, faceIT icon 270 can be pressed and submitted to create a synthetic image with one or more preferential criteria.

Figure 2C:
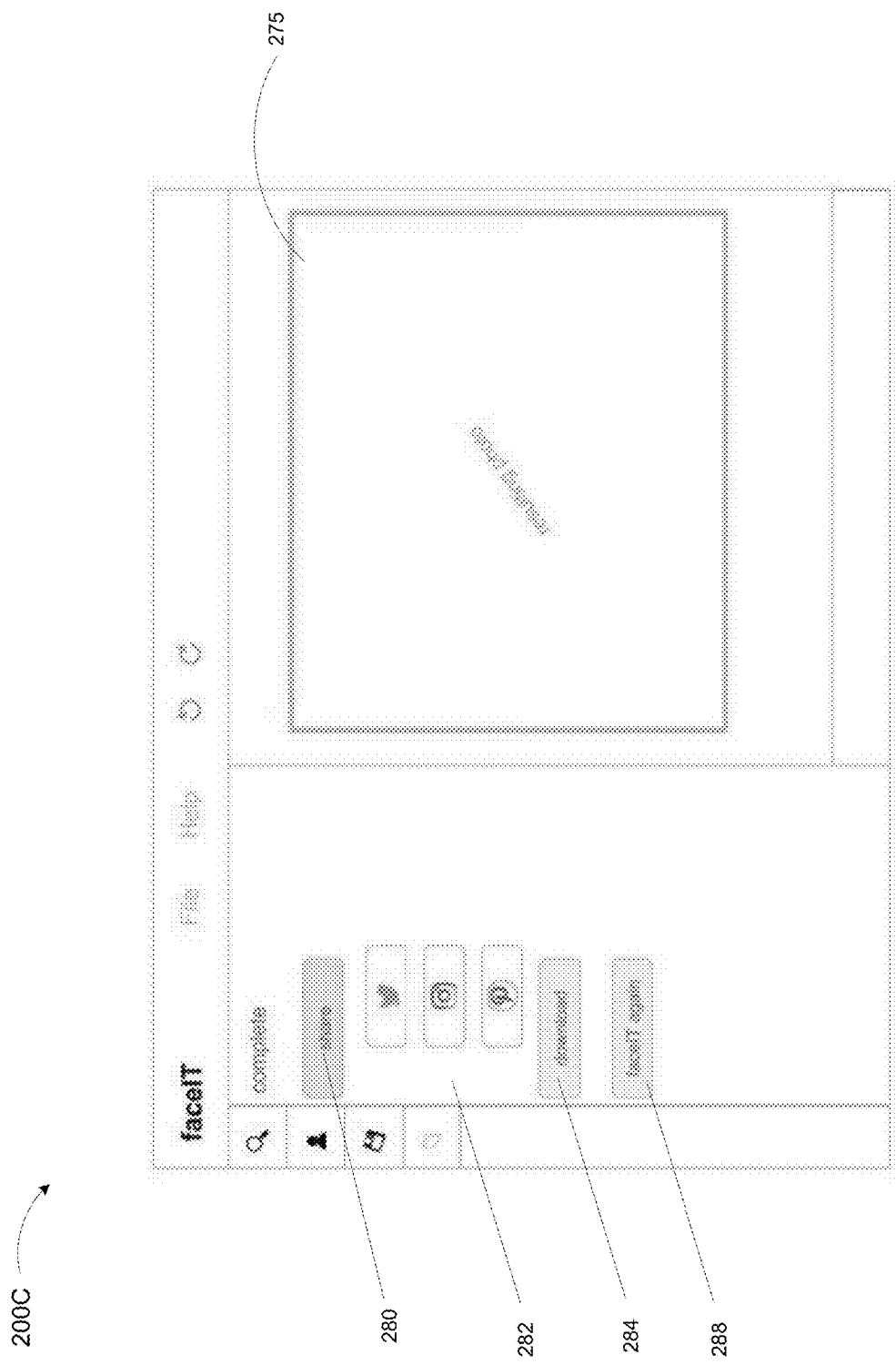
FIG. 2C is another example user interface for an image editing application for providing a synthetic image, according to an illustrative implementation.

FIG. 2C is another example user interface 200C for an image editing application for providing a synthetic image, according to an illustrative implementation. Once the synthetic image 275 is displayed, the synthetic image 275 can be shared via a share icon 280 via social media icons 282 as shown in the user interface 200C. The user interface 200C also includes a download icon 284 for an option to download the synthetic image 275 onto a local hard drive. If the synthetic image 275 is not desirable or an alternative synthetic image is desired, a faceIT again icon 288 can be pressed to restart the entire process to generate a new synthetic image.

The computer system can include one or more communication buses or mechanisms for communicating information, and a processor coupled with the one or more communication mechanisms for processing information. By way of example, the computer system may be implemented with one or more processors. The processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The example computer system can include, in addition to hardware, code that creates an execution environment for the computer program in question, e.g., code that constitutes processor firmware, a protocol stack, a database management system, an operating system, or a combination of one or more of them stored in an included memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to communication mechanism for storing information and instructions to be executed by processor. The processor and the memory can be supplemented by, or incorporated in, special purpose logic circuitry.

The instructions may be stored in the memory and implemented in one or more computer program products, i.e., one or more modules of computer program instructions encoded on a computer readable medium for execution by, or to control the operation of, the computer system, and according to any method well known to those of skill in the art, including, but not limited to, computer languages such as data-oriented languages (e.g., SQL, dBase, Hive DDL), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory may also be used for storing temporary variable or other intermediate information during execution of instructions to be executed by processor.

The computer system further includes a data storage device, such as a magnetic disk or optical disk, coupled to bus the communication mechanism for storing information and instructions. The computer system may be coupled via input/output module to various devices. The input/output module can be any input/output module. Exemplary input/output modules include data ports such as USB ports. The input/output module is configured to connect to a communications module. Exemplary communications modules include networking interface cards, such as Ethernet cards and modems. In certain aspects, the input/output module is configured to connect to a plurality of devices, such as an input device and/or an output device. Exemplary input devices include a keyboard and a pointing device, e.g., a mouse or a trackball, by which a user can provide input to the computer system. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices include display devices such as a LCD (liquid crystal display) monitor, for displaying information to the user, or diagnostic devices such as an oscilloscope.

According to one aspect of the present disclosure, the computing subsystem can be implemented using a computer system in response to processor executing one or more sequences of one or more instructions contained in memory. Such instructions may be read into memory from another machine-readable medium, such as data storage device. Execution of the sequences of instructions contained in the main memory causes processor to perform the process steps described herein. One or more processors in a multi-processing arrangement may also be employed to execute the sequences of instructions contained in the memory. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

In some embodiments, the computer system can include clients and servers. A client and server are generally remote from each other and typically interact through a communication network. The relationship of client and server arises by virtue of computer programs running on the respective computers and having a client-server relationship to each other. The computer system can be, for example, and without limitation, a desktop computer, laptop computer, or tablet computer. The computer system can also be embedded in another device, for example, and without limitation, a mobile telephone such as a smartphone.

The term "machine-readable storage medium" or "computer readable medium" as used herein refers to any medium or media that participates in providing instructions to processor for execution. Such a medium may take many forms, including, but not limited to, non-volatile media, volatile media, and transmission media. Non-volatile media include, for example, optical or magnetic disks, such as data storage device. Volatile media include dynamic memory, such as memory. Transmission media include coaxial cables, copper wire, and fiber optics, including the wires that comprise bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

Various examples of aspects of the disclosure are described below. These are provided as examples, and do not limit the subject technology.

In one or more aspects, examples of clauses are described below.

A method comprising one or more methods, operations or portions thereof described herein.

An apparatus comprising one or more memories and one or more processors, the one or more processors configured to cause performing one or more methods, operations or portions thereof described herein.

An apparatus comprising one or more memories (e.g., one or more internal, external or remote memories, or one or more registers) and one or more processors coupled to the one or more memories, the one or more processors configured to cause the apparatus to perform one or more methods, operations or portions thereof described herein.

An apparatus comprising means adapted for performing one or more methods, operations or portions thereof described herein.

A processor comprising modules for carrying out one or more methods, operations or portions thereof described herein.

A hardware apparatus comprising circuits configured to perform one or more methods, operations or portions thereof described herein.

An apparatus comprising means adapted for performing one or more methods, operations or portions thereof described herein.

An apparatus comprising components operable to carry out one or more methods, operations or portions thereof described herein.

A computer-readable storage medium (e.g., one or more internal, external or remote memories, or one or more registers) comprising instructions stored therein, the instructions comprising code for performing one or more methods or operations described herein.

A computer-readable storage medium (e.g., one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As disclosed herein, the subject disclosure includes spectra reconstruction method to convert sensor data into spectra domain and allow identification and selection of endmember spectra to match the reconstructed spectra.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in a different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various criteria are grouped together in various implementations for the purpose of streamlining the disclosure. The method of disclosure is not to be interpreted as reflecting an intention that the claimed subject matter requires more criteria than are expressly recited in each claim. Rather, as the claims reflect, inventive subject matter lies in less than all criteria of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usage of a word or term in this specification and one or more patent or other documents that may be incorporated herein by reference, the definitions that are consistent with this specification should be adopted.

What is claimed is:

1. A computer-implemented method for providing a synthetic image, the method comprising:
providing, for display, a target image for modification in an image editing application,
receiving, in a user interface of the image editing application, at least one criteria of the target image, the at least one criteria comprising a user-selected portion of the target image;
identifying an attribute in the target image associated with the at least one criteria, the attribute comprising a distribution of pixel data in the user-selected portion of the target image, wherein the distribution of pixel data includes a variable associated with a hidden parameter that has no semantic label in an unsupervised model, and an unlabeled data including a pixel pattern of facial features that is undetectable and undefinable for a human, the unlabeled data used to generate fake images to validate realistic facial images;
blending different facial features from different people to form a synthetic view of individual faces of particular people, and blending elements from city skylines, interior views or party scenes to form a synthetic background view, to anonymize the target image;
providing, based on the attribute, a pool of images retrieved from a network, wherein each image in the pool of images includes a preferential filtered option of the attribute;
selecting, in the user interface of the image editing application, one or more images from the pool of images;
applying a General Adversarial Network (GAN) algorithm to the one or more images;
providing, for display, one or more synthetic images generated by the GAN algorithm in the user interface of the image editing application based on the at least one criteria of the target image; and
selecting, in the user interface of the image editing application, the synthetic image from the one or more synthetic images.

2. The method of claim 1, wherein selecting the at least one criteria of the target image includes selecting a gender from a list of a male or a female, an age category from a list of infant, child, teen, 20s-30s, 40s-50s, 60s-70s, or older, an expression from a list of love, happiness, relief, joy, surprise, anger, sadness, shame, fear, smile, or laughter, or an ethnicity or race from a list of African, African American, Black, Brazilian, Caucasian, East Asian, Hispanic, Japanese, Middle Eastern, East European, West European, South European, North European, Scandinavian, Native American, or Pacific Islanders.

3. The method of claim 1, further comprising selecting specified pixel coordinates and/or dimensions of the target image, from the user-selected portion of the target image.

4. The method of claim 1, wherein the GAN algorithm includes a generative network and a discriminative network and the at least one criteria of the target image is an input parameter for the generative network.

5. The method of claim 4, wherein the generative network generates an image that is compared against the discriminative network to determine whether the image is real or fake.

6. The method of claim 1, wherein the GAN algorithm includes a generative network and a discriminative network that train each other in a recursive process to generate the one or more synthetic images.

7. The method of claim 1, wherein the image editing application is executed on a server and displayed in an internet browser.

8. The method of claim 1, wherein the at least one criteria of the target image is selected from a list of a portion of the target image showing an eye, a portion of the target image showing an eyebrow, a portion of the target image showing a nose, a portion of the target image showing a set of lips, a portion of the target image showing an ear, a portion of the target image showing a forehead, and a portion of the target image showing hair.

9. The method of claim 8, wherein multiple portions of the target image are selected for application of the GAN algorithm.

10. The method of claim 1, further comprising:
selecting, in the user interface of the image editing application, one or more preferential criteria to further change facial attributes of the synthetic image; and
applying the GAN algorithm to generate a new set of synthetic images.

11. The method of claim 10, wherein selecting of one or more preferential criteria includes selecting a gender type from a list of a male or a female or selecting an age category from a list of infant, child, teen, 20s-30s, 40s-50s, 60s-70s, or older.

12. The method of claim 10, wherein selecting of one or more preferential criteria includes selecting one category from a list of African, African American, Black, Brazilian, Caucasian, East Asian, Hispanic, Japanese, Middle Eastern, East European, West European, South European, North European, Scandinavian, Native American, or Pacific Islanders.

13. The method of claim 10, wherein selecting one or more preferential criteria includes selecting an expression from a list of love, happiness, relief, joy, surprise, anger, sadness, shame, fear, smile, or laughter.

14. A system for providing a synthetic image, the system comprising:
a memory; and
a processor configured to execute instructions which, when executed, cause the processor to:
provide, for display, a target image for modification in an image editing application,
receive, in a user interface of the image editing application, at least one criteria of the target image, the at least one criteria comprising a user-selected portion of the target image;
identify an attribute in the target image associated with the at least one criteria, the attribute comprising a distribution of pixel data in the user-selected portion of the target image, wherein the distribution of pixel data includes a variable associated with a hidden parameter that has no semantic label in an unsupervised model, and an unlabeled data including a pixel pattern of facial features that is undetectable and undefinable for a human, the unlabeled data used to generate fake images to validate realistic facial images;

blend different facial features from different people to form a synthetic view of individual faces of particular people, and blend elements from city skylines, interior views or party scenes to form a synthetic background view, to anonymize the target image;

provide, based on the attribute, a pool of images retrieved from a network, wherein each image in the pool of images includes a preferential filtered option of the attribute;

select, in the user interface of the image editing application, one or more images from the pool of images;

apply a General Adversarial Network (GAN) algorithm to the one or more images;

provide, for display, one or more synthetic images generated by the GAN algorithm in the user interface of the image editing application based on the at least one criteria of the target image; and select, in the user interface of the image editing application, the synthetic image from the one or more synthetic images.

15. The system of claim 14, wherein the processor configured to execute instructions which, when executed, cause the processor to select, in the user interface of the image editing application, one or more preferential criteria to further change facial attributes of the synthetic image.

16. The system of claim 15, wherein the processor configured to execute instructions which, when executed, cause the processor to apply the GAN algorithm to generate a new set of synthetic images based on the one or more preferential criteria to further change facial attributes of the synthetic image.

17. The system of claim 14, wherein the at least one criteria is a gender from a list of a male or a female, an age category from a list of infant, child, teen, 20s-30s, 40s-50s, 60s-70s, or older, an expression from a list of love, happiness, relief, joy, surprise, anger, sadness, shame, fear, smile, or laughter, or an ethnicity or race from a list of African, African American, Black, Brazilian, Caucasian, East Asian, Hispanic, Japanese, Middle Eastern, East European, West European, South European, North European, Scandinavian, Native American, or Pacific Islanders.

18. The system of claim 14, wherein the at least one criteria of the target image is selected from a list of a portion of the target image showing an eye, a portion of the target image showing an eyebrow, a portion of the target image showing a nose, a portion of the target image showing a set of lips, a portion of the target image showing an ear, a portion of the target image showing a forehead, and a portion of the target image that shows hair.

19. The system of claim 14, wherein the GAN algorithm includes a generative network and a discriminative network that train each other in a recursive process to generate the one or more synthetic images.

20. A non-transitory machine-readable storage medium comprising machine-readable instructions for causing a processor to execute a method for providing a synthetic image, comprising:

providing, for display, a target image for modification in an image editing application, receiving, in a user interface of the image editing application, at least one criteria of the target image, the at least one criteria comprising a user-selected portion of the target image;

identifying an attribute in the target image associated with the at least one criteria, the attribute comprising a distribution of pixel data in the user-selected portion of the target image, wherein the distribution of pixel data includes a variable associated with a hidden parameter that has no semantic label in an unsupervised model, and an unlabeled data including a pixel pattern of facial features that is undetectable and undefinable for a human, the unlabeled data used to generate fake images to validate realistic facial images;

blending different facial features from different people to form a synthetic view of individual faces of particular people, and blending elements from city skylines, interior views or party scenes to form a synthetic background view, to anonymize the target image;

providing, based on the attribute, a pool of images retrieved from a network, wherein each image in the pool of images includes a preferential filtered option of the attribute;

selecting, in the user interface of the image editing application, one or more images from the pool of images;

applying a General Adversarial Network (GAN) algorithm to the one or more images;

providing, for display, one or more synthetic images generated by the GAN algorithm in the user interface of the image editing application based on modification of at least one feature of the target image; and selecting, in the user interface of the image editing application, the synthetic image from the one or more synthetic images.

* * * * *